United States Patent [19]

Koga et al.

[11] 4,105,455

[45] Aug. 8, 1978

[54] METHOD OF PRODUCING DENSE SINTERED SILICON CARBIDE BODY FROM POLYCARBOSILANES

[75] Inventors: Kazunori Koga; Saburo Nagano, Kyoto, both of Japan

[73] Assignee: Kyoto Ceramic Kabushiki Kaisha, Kyoto, Japan

[21] Appl. No.: 824,062

[22] Filed: Aug. 12, 1977

[30] Foreign Application Priority Data

Aug. 17, 1976 [JP] Japan .................................. 51-98292
Feb. 16, 1977 [JP] Japan .................................. 52-16543

[51] Int. Cl.$^2$ ............................................. C04B 35/56
[52] U.S. Cl. ........................................ 106/44; 264/65; 423/345
[58] Field of Search ................... 423/344, 345; 106/44; 264/65

[56] References Cited

U.S. PATENT DOCUMENTS

| 3,853,566 | 12/1974 | Prochazka | 106/44 |
| 3,853,567 | 12/1974 | Verbeek | 106/44 |
| 4,023,975 | 5/1977 | Prochazka | 106/44 |

FOREIGN PATENT DOCUMENTS

| 2,236,078 | 3/1974 | Fed. Rep. of Germany | 106/44 |
| 46-66,299 | 4/1973 | Japan | 106/44 |

OTHER PUBLICATIONS

Register of Oganosilicon Compounds, vol. 2, (1965) Academic Press, NYC, pp. 191 & 514.
Yajima, S. et al., "Structural Analysis in Continuous Silicon Carbide Fiber of High Tensile Strength", Chem. Lttrs. (1975), pp. 1209–1212.
Yajima, S. et al., "Synthesis of Continuous SiC Fibers with High Tensile Strength", J. Am. Cer. Soc., 59 (7-7) pp. 324–327 (Rec'd by PTO 6 Aug. 76).
Alliegro; R. A. et al., "Pressure-Sintered Silicon Carbide", J. Am. Cer. Soc., 39, (11) 1956, pp. 386–389.

*Primary Examiner*—Helen McCarthy
*Attorney, Agent, or Firm*—Spensley, Horn, & Lubitz

[57] ABSTRACT

A method of producing a sintered silicon carbide body high in density, flexural strength and purity at elevated temperatures from polycarbosilanes is disclosed. The method involves the following steps:

(A) polymerizing organosilicon compounds to yield specific polycarbosilanes which are insoluble in solvents and unmeltable i.e. the polycarbosilanes being higher in melting temperature or in softening temperature than in thermal decomposition temperature;

(B) pulverizing the insoluble and unmeltable polycarbosilanes so as to form a powder;

(C) applying heat with or without the use of pressure to the powder charged into a hot press mold in a nonoxidizing atmosphere to thereby decompose the same thermally into silicon carbide and sintering the silicon carbide under pressure.

21 Claims, 1 Drawing Figure

METHOD OF PRODUCING DENSE SINTERED SILICON CARBIDE BODY FROM POLYCARBOSILANES

BACKGROUND OF THE INVENTION

1. Field of the Invention

This invention relates to a method of producing a dense sintered silicon carbide body from polycarbosilane as a starting material, and more particularly, to a method of producing a strong sintered silicon carbide body which has high purity, high temperature flexural strength of about 2.4 to about 3.2 g/cm$^3$ and a flexural strength of about 13 to about 45 kg/cm$^2$.

2. Prior Art

The new ceramic engineering technology is capable of providing a sintered body of covalent solids such as SiC which can replace the conventional type sintered oxide ceramics. These conventional type oxide ceramics are obtained by sintering the powder of metallic oxides such as $Al_2O_3$, $SiO_2$, MgO, $ZrO_2$, $TiO_2$ alone or in mixtures. The establishing of sintering technology has been known for sometime along with the development of new materials sinterable into a dense body. As for the sintering of SiC, a dense sintered body of SiC has been obtained through a hot press process by using powdered SiC together with several percent of bonding agent such as aluminum, boron, metallic silicon, tungsten carbide, etc. It appears that such sintered SiC body is high in compressive strength, and excellent also in thermal shock resistance and oxidation resistance.

However, in the prior art processes, because components other than SiC, such as alumina, silicon, boron, free carbon, silicon nitride, tungsten carbide, etc. are included in the resulting sintered body as a bonding agent, the strength of the SiC body is reduced at elevated temperature which places restrictions on its use.

In U.S. Pat. No. 3,853,566, Prochazka has disclosed a production method of dense sintered silicon carbide articles by hot pressing submicron silicon carbide powder prepared by sedimentation techniques from commercially available silicon carbide powder (Norton E 277), and adding submicron $B_4C$ powder as a sintering aid in a temperature range of 1900°–2000° and pressure range of 350–700 kg/cm$^2$. The chemical and physical properties of the dense sintered silicon carbide developed by Prochazka are superior to those of dense sintered silicon carbide mentioned above. Unfortunately, this method is expensive and has difficulties in preparing and processing these submicron powders. That is to say, to obtain submicron silicon carbide powder, this method requires many process steps such as obtaining silicon carbide, suspension, sedimentation and separation processes, evaporation process, etc. Moreover, the yield by this method is so low that the sintered silicon carbide body is very expensive.

The methods of preparing a pure silicon carbide article from low molecular weight organosilicon polymers are disclosed in Japanese patent application Nos. 115965/1975 and 134122/1975, but these methods are not free from certain detriments either. That is to say, the low molecular weight organosilicon polymers disclosed in these Japanese patent applications melt or evaporate at low temperatures before forming silicon carbide during a firing process, producing a large quantity of exhaust gas by thermal decomposition of the polycarbosilane. Moreover, silicon carbide produced by the decomposition of polycarbosilane evaporates readily at sintering temperature. Accordingly, the decomposed gas and the volatile component remain within the sintered body in large quantities. Furthermore, blowholes are produced on the surface of the sintered body. The defects of the kind described substantially reduce the flexural strength and high temperature strength of the sintered body.

OBJECT OF THE INVENTION

A primary object of the invention is to provide a method of producing from insoluble and unmeltable polycarbosilane, a dense and strong sintered silicon carbide body which is high in purity and flexural strength at elevated temperature and which has a density of about 2.4 to about 3.2 g/cm$^3$ and a flexural strength of about 13 to 45 kg/mm$^2$.

Another object of the invention in conjunction with the primary object is to reduce the sintering temperature by a maximum of about 100° C to thereby save heat and reduce production cost.

These and other objects and advantages of this invention will become apparent from a detailed description of preferred embodiments shown by way of example. In keeping with the principles of the present invention, the objects are accomplished by a unique method which comprises the steps of polymerizing organosilicon compounds to yield specific polycarbosilanes which are insoluble in organic solvents and unmeltable because the polycarbosilane has a melting or a softening temperature higher than a thermal decomposition temperature (hereinafter referred to as insoluble and unmeltable polycarbosilane); pulverizing the insoluble and unmeltable polycarbosilane into a powder; and hot pressing the powder by charging a hot press mold with the powder with or without a suitable sintering aid, then heating the powder with or without the application of pressure in a nonoxidizing atmosphere to thereby decompose the same thermally into silicon carbide and sintering the silicon carbide under pressure. This invention further includes a method of reducing the sintering temperature by changing the time of addition of a sintering aid. The method of the invention is highly useful in the field of production of industrial materials which demand good flexural strength at high temperatures, such as, for example, combustion chambers, turbine blades for a gas turbine engine, and the like.

DETAILED DESCRIPTION OF THE INVENTION

Figure 1:
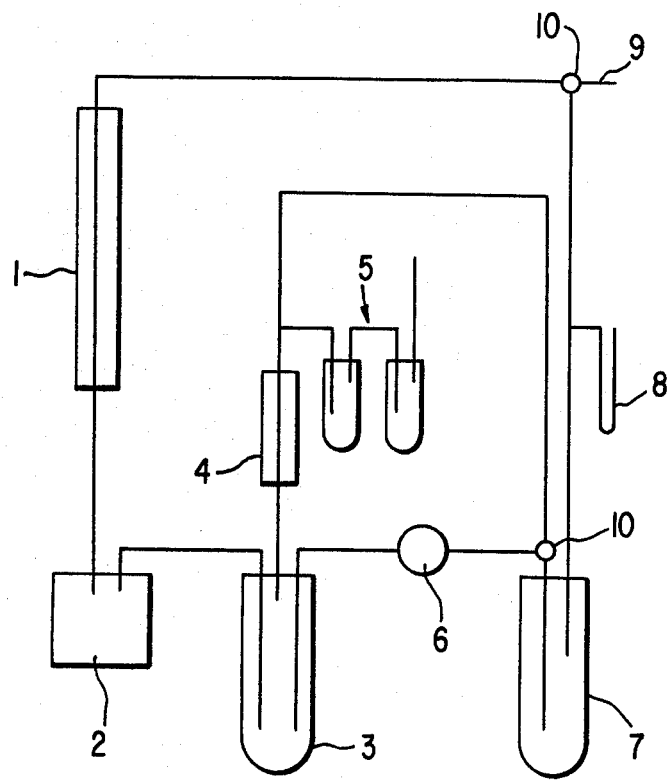
FIG. 1 is a schematic representation of a device for thermally decomposing and polymerizing organosilicon compounds to produce solid or liquid polycarbosilane soluble in solvents and meltable with heat.

The method of this invention essentially comprises the following steps:

(A) polymerizing organosilicon compounds to yield insoluble and unmeltable polycarbosilane which is the starting material.

(B) pulverizing the polycarbosilane to produce powder, and (C) hotpressing the powder by charging the powder into a hot press mold by heating the powder with or without the application of pressure thereto in a nonoxidizing atmosphere to thereby decompose the powder to produce silicon carbide and sintering the silicon carbide by applying heat and pressure thereto.

I. The Polymerization - Step (A):

One or more kinds of organosilicon compounds such as for example, tetramethylsilane, dimethyldichlorosilane, dodecamethylcyclohexasilane, 1,1,3,3 — tetramethyl — 1,3,-disilacyclobutane, etc. are subjected to polymerization reaction with or without the addition of a catalyst by at least any one of known means such as irradiation, heating, addition of polymerization catalyst, to produce an insoluble and unmeltable polycarbosilane. In this polymerization Step (A), polysilane and soluble and meltable polycarbosilane are intermediately produced. With reference to dimethyldichlorosilane and dodecamethylcyclohexasilane, these materials are the organosilicon compounds used by way of example.

The preferred embodiments of this polymerization Step (A) will be described in the following.

EXAMPLE (I)-1:

10 parts by weight of dimethyldichlorosilane and four parts by weight of sodium were made to react in a solvent xylene, to produce white polysilane. The white polysilane obtained was then charged into an autoclave and heated at 490° C under a pressure of 250 kg/cm² for about 20 hours to obtain insoluble and unmeltable polycarbosilane.

EXAMPLE (I)-2:

The above polysilane was heated in a quartz tube with a condenser and was converted into a colorless and transparent liquid at about 300° C, and the resulting liquid polycarbosilane was refluxed for about 10 hours and finally elevated to a temperature of 600° C to obtain insoluble and unmeltable polycarbosilane.

EXAMPLE (I)-3:

Dodecamethylcyclohexasilane obtained by the reaction of dimethyldichlorosilane with metallic lithium was heated in an autoclave at 490° C for 20 hours, to obtain insoluble and unmeltable polycarbosilane.

The above processes in Examples (I)-1 to (I)-3 are the ones preferably employed in the polymerization Step (A), and polycarbosilane obtained by any one of the above procedures is not only insoluble in general organic solvents such as normal hexane, benzene, alcohols, dichloromethane, dichloroethane, xylene, etc., but also begins to decompose thermally at 600° C. It is made into silicon carbide at approximately 1000° C. At such a temperature, the exact melting temperature is not readily measurable. Furthermore, reduction in weight due to the thermal decomposition is 6 to 15% at 1300° C.

In the processes in Examples (I)-1 to (I)-3, when the heating temperature is lower than the temperature specified and the reaction time is shorter than the time specified, the polycarbosilane obtained has such a low molecular weight polycarbosilane that it is dissolved in normal hexane due to insufficiency in polymerization, and therefore is not made into the starting material for the present invention.

Step (B):

The insoluble and unmeltable polycarbosilane obtained in Step (A) is charged into the alumina mortar, agate mortar or ball mill and pulverized. The resulting powder is screened by a suitable screening instrument so as to obtain powder below 80 mesh, preferably below 100 mesh. This Step (B) is intended to provide uniform charging of the powder into a hot press mold in the hot press Step (C) to be later described and to provide as much uniform mixing of the powder with a sintering aid as possible when the aid is added and mixed therewith. In case the grain size of insoluble and unmeltable polycarbosilane powder is larger than 80 mesh, neither uniform charging of the polycarbosilane powder into a hot press mold nor uniform mixing of the powder with the sintering aid is achieved. Sinterability therefore is also reduced.

III. The Press - Step (C):

A dense sintered silicon carbide body of high flexrual strength is produced by evenly charging the insoluble and unmeltable polycarbosilane screened through 80 mesh obtained in the above Step (B) into a hot press mold, and heating the powder with or without the application of pressure thereto in a nonoxidizing atmosphere to thereby thermally decompose the powder to produce silicon carbide, which is an intermediate, and sintering the silicon carbide into a sintered body under pressure. By way of definition, the silicon carbide intermediate is meant to define unsintered silicon carbide produced by thermal decomposition of the insoluble and ummeltable polycarbosilane powder in the hot press mold in a temperature range of 600° to 1000° C, and is to be sharply distinguished from the dense silicon carbide sintered body obtained by continuously heating and pressing the unsintered silicon carbide intermediate in the same hot press in a temperature range of 1830° to 2200° C.

A graphite mold is usually used as a hot press mold, and either resistance heating or induction heating is used. As for a pressure applying means, a hydraulic or pneumatic ram system is usually employed. When a graphite mold is used as a hot press mold, there is no necessity of particularly charging the mold with nonoxidizing gas because the mold is internally maintained in a $CO_2 + CO$ atmosphere. In the case of other type molds it may be necessary to charge those molds with an inert gas such as Ar, $N_2$ or the like. In place of the inert gas atmosphere, a vacuum atmosphere may also be employed. As for a hot press temperature, a temperature ranging from 600° to 1000° C is necessary for thermal decomposition of the polycarbosilane powder and a temperature of 1900° to 2200° C is necessary for the subsequent sintering of the silicon carbide. Accordingly a heating cycle in the hot press Step (C) includes primary heating from room temperature to a temperature range of 600° to 1000° C and secondary heating from the temperature range of 600° to 1000° C to a temperature range of 1900° to 2200° C. The pressure required in the primary heating is up to 250 kg/cm², normally 30 kg/cm² for compacting the polycarbosilane powder, and is a maximum of 250 kg/cm² for subsequent sintering of the silicon carbide, e.g. the secondary heating. However, the pressure in the primary heating should be determined in connection with the amount of $H_2$ and $CH_4$ gases exhausted from the polycarbosilane powder. Generally, there are two cases, one being the case wherein the initial pressure is set at a low pressure (30 kg/cm² in a preferred embodiment). Thermal decomposition of the polycarbosilane in a temperature range of 600° to 1000° C is sufficiently effected, and in this case the decomposed gas is exhausted from the mold. Then, the temperature and the pressure are raised respectively to 1900° to 2200° C and to 250 kg/cm² to sinter the silicon carbide produced in thermal decomposition. In the second case, a high pressure of 250 kg/cm² is applied from the outset and the temperature is elevated to 1000° C. After the thermal decomposition and the exhaustion of the decomposed gas are sufficiently effected at this temperature, then, the temperature is raised to 1900° to 2000° C to sinter the silicon carbide. In this hot press Step (C), a starting material, carbosilane, is decomposed and sintered in the following manner:

$$\text{Polycarbosilane} \xrightarrow[\text{Decompressed gas CH}_4, \text{H}_2, \text{etc.}]{\text{Heating from room temp. to 1000° C}} \text{SiC}$$

$$\text{Heating at 1900-2200° C} \xrightarrow{} \beta\text{SiC} \xrightarrow{\text{Same temp. held}} \text{SiC sintered body}$$

The crystallographic phases of the sintered body are $\beta$-SiC alone or both $\beta$-SiC and $\alpha$-SiC, but the ratio of $\beta$-SiC to $\alpha$-SiC varies depending upon the sintering temperature of 1900° to 2200° C and the period of time at which the temperature is held.

The method of this invention essentially comprises the above Polymerization Step (A), Pulverization Step (B), and Hot Press Step (C), in order to improve sintering ability and/or to reduce the sintering temperature, it is also possible to replace the Step (B) by Step (B') described below, and/or replace the Polymerization Step (A) by the Polymerization Step (A') described below.

II' The Step (B'):

A sintering aid is added to and mixed with the insoluble and unmeltable polycarbosilane powder produced in a manner similar to the above Step (B). Among the sintering aids used are simple substances or compounds as B, C, Al, Fe, Ga, Ti, W, Mg, Ca, Ni, Cr, Mn, Zr, In, Sc, Be, or the like. Preferably, B$_4$C, Fe, Al, ZrB$_2$, W, MgO, etc. are suitable, and these are used alone or in combination. The amount of sintering aid added and mixed is preferably in ratio of 0.3 to 1% by weight of the polycarbosilane powder. In the case of the ratio being less than 0.3%, the density of the sintered body to be obtained is reduced and porosity of the same is increased, when an excess of the aid in ratio over 1.0 weight there is a tendency of B, Fe, Al and the like to be unevenly existent on the grain boundary of the sintered body causing a reduction of the high temperature strength. As a means for mixing the sintering aid with the polycarbosilane powder, conventional dry or wet blending may be used.

I' The Polymerization Step (A)

In the course of polymerization of organosilicon compounds, a sintering aid is added in any of three processes, namely, (1) in a process of producing polysilane from the organosilicon compounds, (2) in a process of producing soluble and meltable polycarbosilane from the polysilane, and (3) in a process of heating for making the polycarbosilane insoluble and unmeltable. By such addition of the aid, the aid is evenly dispersed in a liquid phase or gas phase in the above processes of production of the high molecular weight silicon compound. As a result thereof, the chemical bonding of the sintering aid, namely, at least a mixture thereof on a molecular level is effected in the insoluble and unmeltable polycarbosilane subsequently obtained. Preferred effects by the addition are obtained over the mere mechanical blending means employed in the Step (B'). Thus, the addition of an aid contributing toward the reduction of sintering temperature is preferred. In the Step (A'), particularly such a simple substance as B, Al, Fe and Ti out of the sintering aids mentioned above, and a halide or organic compound thereof is suitably used. These sintering aids are used by themselves or in suitable combination and are added to include 0.1 to 3.0% by weight of elements of the respective aids in the insoluble and unmeltable polycarbosilane. Since the method as described above promotes the uniform dispersion of the aid by chemical bonding or mixing on a molecular level, the range of the amount of the aid added can be extended, and when the amount of the aid is below 0.1% by weight, the density of sintered body becomes insufficient. When it exceeds 3.0% by weight, there appears a tendency towards the reduction of high temperature strength of the sintered body being reduced.

Employment of this polymerization Step (A') provides the advantage that sintering temperature in the hot press step (C) is reduced by a maximum of 100° C (1830° to 2100° C), and accordingly, the simplicity relative to setting of sintering conditions at a high temperature and production cost can be achieved.

The invention will now be described further by the following examples.

EXAMPLE 1

I) Polymerization Step (A)

Insoluble and unmeltable polycarbosilane was obtained as a starting material according to the process in Example (1)-1.

II) Step (B)

The polycarbosilane above was pulverized in an alumina mortar and passed through a 100 mesh sieve to obtain powder below 100 mesh.

III) Hot Press Step (C)

The above powder was charged into a graphite mold to which a mold releasing agent (colloidal carbon) had previously been applied, and the mold was inductively heated under a pressure of 250 kg/cm². When the temperature reached 1000° C, the temperature was held for 15 minutes during which decomposed gas was exhausted from the mold. Thereafter, the temperature was further raised to 2200° C. Upon the temperature reaching 2200° C, both load and power were shut off and the system was allowed to cool.

EXAMPLE 2

I) Polymerization Step (A)

The same as in Example (I)—1.

II') Step (B')

The above polycarbosilane was pulverized in an alumina mortar and passed through a 100 mesh sieve to obtain powder. To the powder obtained was added 0.3% by weight, of B$_4$C and mixed by dry blending.

III) Hot Press Step (C)

The mixed powder was charged into a graphite mold to which a mold releasing agent (colloidal carbon) had previously been applied, and was heated to 1000° C under a pressure of 30 kg/cm². After this temperature was achieved, the load was increased to 250 kg/cm² and the temperature was further raised to 2100° C. Upon the temperature reaching 2100° C, both load and power were shut off immediately.

EXAMPLE 3

I) Polymerization Step (A)

The same as in Example (I)-1.

II') Step (B')

The procedure taken was the same as that in Example 2 except that 0.6% by weight of $B_4C$ was used.

III) Hot Press Step (C)

The mixed powder was charged into the graphite mold to which a mold releasing agent (colloidal carbon) had previously been applied, and was heated to 2100° C under a pressure of 250 kg/cm². Upon the temperature reaching 2100° C, both load and power were shut off immediately.

EXAMPLE 4

I) Polymerization Step (A)

The same as in Example (I)-1.

II') Step (B')

The same as in Example 3.

III) Hot Press Step (C)

The mixed powder was charged into a graphite mold to which a mold releasing agent (colloidal carbon) had previously been applied, and was heated to 1000° C under a pressure of 250 kg/cm². After the temperature reached 1000° C, the temperature was held for 15 minutes. The temperature was further raised to 2100° C and then both load and power were shut off.

EXAMPLE 5

I) Polymerization Step (A)

Insoluble and unmeltable polycarbosilane was obtained according to process in Example (I)-2.

II') Step (B')

The same as in Example 4.

III) Hot Press Step (C)

The procedure was the same as that in Example 4 except that the final firing temperature of 2100° C was reduced to 2050° C.

EXAMPLE 6

I) Polymerization Step (A)

Insoluble and unmeltable polycarbosilane was obtained according to process in Example (I)-3.

II) Step (B')

The polycarbosilane above was pulverized in an alumina mortar and passed through a 100 mesh sieve. To the powder thus obtained was added 1.0% by weight, of $B_4C$ and then mixed by dry blending.

III) Hot Press Step (C)

The mixed powder was charged into a graphite mold to which a mold releasing agent (BN) had previously been applied, and the powder was heated to 1000° C under a pressure of 30 kg/cm². After this temperature was achieved, the load was increased to obtain 210 kg/cm², and the temperature was further raised to 1950° C and then both load and power were shut off.

EXAMPLE 7

I') Polymerization Step (A')

One kg of dimethyldichlorosilane, 10 gr. of titanium-iso-propoxide and 400 gr. of sodium were reacted in xylene by refluxing for 12 hours to obtain 410 gr. of polysilane containing titanium. The 400 gr. of polysilane containing titanium was heated in an autoclave for 20 hours at 490° C, to obtain 195 gr. of insoluble and unmeltable polycarbosilane containing about 1% by weight of titanium.

II) Step (B)

After the above polycarbosilane was pulverized in an alumina mortar, the pulverized polycarbosilane was passed through a 100 mesh sieve.

III) Hot Press Step (C)

The sieved powder was charged into a graphite mold to which a mold releasing agent (colloidal carbon had previously been applied. The powder in the mold was heated to 1000° C under a pressure of 250 kg/cm². After the temperature reached 1000° C, the temperature was held for 15 minutes. The temperature was further raised to 2000° C, and then both load and power were shut off.

EXAMPLE 8

I') Polymerization Step (A')

One kg of dimethyldichlorosilane and 400 gr. of sodium were reacted in xylene by refluxing for 12 hours to obtain 423 gr. of polysilane. 400 gr. of the polysilane was heated at 460° C in an autoclave for 14 hours, to obtain 255 gr. of polycarbosilane, soluble in a n-hexane. 4 gr. of aluminum-iso-propoxide was mixed with the polycarbosilane, and was heated to 490° C for 8 hours in the autoclave, to obtain 201 gr. of insoluble and unmeltable polycarbosilane containing about 3.0% by weight of aluminum.

II) Step (B)

The same as in Example 7.

III) Hot Press Step (C)

The above powder was charged into a graphite mold to which a mold releasing agent (colloidal carbon) had previously been applied. The powder in the mold was heated to 1000° C under a pressure of 30 kg/cm². After this temperature was achieved, the load was increased to obtain 250 kg/cm², and the temperature was further raised to 1830° C and then both load and power were shut off.

EXAMPLE 9

I') Polymerization Step (A')

2.1 gr. of aluminum-iso-propoxide was mixed with 100 gr. of the polysilane obtained in the polymerization Step (A') in Example 8, and the mixture was heated to about 300° C while Ar gas was flowed in a reaction tube of quartz having a condenser, and thus colorless transparent carbosilane was produced. This liquid carbosilane was refluxed for about 10 hours and was finally elevated to a temperature of 600° C, to obtain 33 gr. of insoluble and unmeltable carbosilane containing about 0.7% by weight of aluminum.

II) Step (B)

The same as in Example 7.

III) Hot Press Step (C)

The procedure was entirely the same as that in Example 7 except that the final firing temperature of 2000° C was reduced to 1900° C.

EXAMPLE 10

I') Polymerization Step (A')

400 gr. of dodecamethylhexacyclosilane obtained through reaction of dimethyldichlorosilane with lithium was mixed with 5.0 gr. of ferrous oxalate and was heated in an autoclave to 490° C for 20 hours, to obtain 226 gr. of insoluble and unmeltable polycarbosilane containing about 1% by weight of iron.

II) Step (B)

The same as in Example 7.

III) Hot Press Step (C)

The procedure was entirely the same as that in Example 7 except that the final firing temperature of 2000° C in Example 7 was elevated to 2100° C.

EXAMPLE 11

I') Polymerization Step (A')

400 gr. of polysilane obtained in the polymerization step (A') in Example (I)-2 was heated at 460° C in an autoclave for 14 hours, to obtain 278 gr. of polycarbosilane soluble in an organic solvent such as n-hexane. 8.0 gr. of methyl borate was mixed with the polycarbosilane thus obtained, and the mixture was heated at 490° C in an autoclave for eight hours, to obtain 230 gr. of insoluble and unmeltable polycarbosilane containing about 0.5% by weight of boron.

II) Step (B)

The same as in Example 7.

III) Hot Press Step (C)

The procedure is entirely the same as that in Example 8 except that the final firing temperature os 1830° C in Example 8 was elevated to 1950° C.

EXAMPLE 12

I) Polymerization Step (A)

The device used to produce the insoluble and unmeltable polycarbosilane, is schematically shown in FIG. 1. In FIG. 1, numeral 3 designates a trap; 4 a condenser; 8 a manometer; 9 a $N_2$ inlet; and 10 designates a valve. After introducing an $N_2$ atmosphere into the system, 100 ml of tetramethylsilane was charged into Trap 3, and the tetramethylsilane was moved by a pump 6 to an evaporator 7, and was evaporated. The vapor was pased at a rate of 2l/min. through a reactor 1 heated to a temperature of 700° to 800° C with silica gel as a heat medium to polymerize into organosilane polymer and collected in the receiver. The unaltered vapor was agan circulated for reaction and the low boiling temperature gas produced by thermal decomposition was discharged out of the system through a Trap 5. This procedure was carried out for about 10 hours, and 18.3 gr. of soluble and meltable yellowish-brown solid polycarbosilane and 20lm of light yellow liquid polycarbosilane was produced in the receiver 2. These solid and liquid polycarbosilanes were heated in an autoclave for 10 hours, to obtain insoluble and unmeltable polycarbosilane.

II') Step (B')

The procedure was the same as that in Example 6 except that WC was used as a sintering aid instead of $B_4C$.

III) Hot Press Step (C)

This mixed powder was charged into a graphite mold to which a mold releasing agent (colloidal carbon) had previously been applied, and was heated to 1000° C under a pressure of 250 kg/cm². After the temperature was achieved, this 1000° C temperature was maintained for 15 minutes. The temperature was further raised to 2200° C and maintained for 30 minutes. Thereafter, both load and power were shut off.

EXAMPLE 13

I') Polymerization Step (A')

The polymerization reaction was carried out in the same manner as in Example 12 except that 100 ml of tetramethylsilane used in the polymerization Step (A) in Example 12 was replaced by a mixture of 100 ml of tetramethylchlorosilane with 10 ml of boron trichloride, to obtain 20 gr. of yellow soluble and meltable solid polycarbosilane and 16 m of yellow liquid polycarbosilane. The solid and liquid polycarbosilanes obtained were heated at 490° C in an autoclave for 10 hours, to obtain insoluble and unmeltable polycarbosilane containing about 0.6% of boron.

II) Step (B)

The same as in Example 7.

III) Hot Press Step (C)

The same as in Example 3.

Contrast Example 1

Fine alpha silicon carbide and graphite powders were mixed with an appropriate plasticizer and formed into shape by means of extrusion, die pressing or isostatic pressing.

The process of siliconizing occurs in a partially evacuated chamber where silicon monoxide evaporating from a silicon pool in which the body was placed reacted with the outer body layer at a temperature of 1600° to 1700° C. The inner body acted as a wick through which the silicon rose by capillary action, reacting exothermically with free graphite to form beta silicon carbide. This beta phase cemented the alpha grain together. This method is called a Refel method developed by UKAEA (United Kingdom Atomic Energy Authority).

Contrast Example 2

A mixture of alpha silicon carbide and graphite plasticizer by carbon-bearing binders formed by extrusion or pressing. The material, after curing, was heated to a temperature range of 2000° to 2500° C in an atmosphere where vapors rising from a molten-silicon source reacted with the carbonaceous material to form beta silicon carbide. This beta phase cemented to alpha grain together. This method is called Carborundum — KT method.

Contrast Example 3

(a) Sintering material: SiC powder,
(b) Binding agent: Soluble and meltable low molecular weight polycarbosilane, and
(c) Molding:

90% by weight of SiC powder and 10% by weight of polycarbosilane as a binder were mixed in a n-hexane solvent. The solvent was evaporated to yield mixed powder of SiC and polycarbosilane. This mixed powder was shaped into a rod by pressing. The rod was fired at 1000° C in a $N_2$ atmosphere and this temperature was held for one hour. Polycarbosilane used as a binder was low molecular weight compound of 1500 mean molecular weight obtained by heating 10 gr. of linear dimethylpolysilane synthesized from dimethyldichlorosilane in an autoclave at 400° C for 30 hours. This method is disclosed in Japanese patent application Ser. No. 115965/1975.

Contrast Example 4

Polycarbosilane obtained in Contrast Example 3 was impregnated into the firing body obtained in Contrast Example 3, and the impregnated body was fired at 1000° C in a $N_2$ atmosphere. This procedure was repeated six times in all. This method is disclosed in Japanese patent application serial No. 134122/1975.

Tha ability of examples 1 through 13 and contrast examples 1 through 4 are shown in Table 1 (see page 23 of this document).

TABLE 1

| Test content Object | | Density (g/cm³) | Porosity (Vol %) | Flexural strength (Kg/mm²) | Firing temperature (° C) | Impurities (% by wgt.) |
|---|---|---|---|---|---|---|
| Example of the invention | 1 | 2.43 | 22.1 | 13 | 2200 | None |
| | 2 | 3.02 | 2.6 | 30 | 2100 | B₄C 0.3 |
| | 3 | 2.84 | 6.5 | 25 | 2100 | B₄C 0.6 |
| | 4 | 3.13 | 0 | 34 | 2100 | B₄C 0.6 |
| | 5 | 3.10 | 0.2 | 42 | 2050 | B₄C 0.6 |
| | 6 | 2.50 | 17.1 | 18 | 1950 | B₄C 1.0 |
| | 7 | 2.63 | 11.5 | 25 | 2000 | Ti 1.0 |
| | 8 | 2.80 | 7.0 | 23.0 | 1830 | Al 3.0 |
| | 9 | 3.15 | 0 | 44.2 | 1900 | Al 0.7 |
| | 10 | 2.80 | 6.7 | 19.1 | 2100 | Fe 1.0 |
| | 11 | 2.95 | 2.3 | 24.1 | 1950 | B 0.5 |
| | 12 | 2.97 | 4.8 | 28 | 2200 | WC 1.0 |
| | 13 | 2.71 | 10.5 | 23 | 2100 | B 0.6 |
| Contrast example | 1 | 3.12 | <0.1 | 42 | | 10% free Si |
| | 2 | 3.10 | 0 | 16 | | 9% free Si |
| | 3 | 2.21 | 31 | 2 | 1000 | 0 |
| | 4 | 2.63 | 10 | 16 | 1000 | 0 |

As apparent from TABLE 1, the sintered silicon carbide body provided by this invention indicates high strength, having a density of about 2.4 to 3.2 g/cm³ and a flexural strength of about 13 to 45 kg/mm², and is in no way inferior to that exemplified by Contrast Examples. As for the addition of a sintering aid, the sintered silicon carbide body including therein 0.3 to 1.0% by weight of aid is superior to that which includes no aid. When 0.6 to 0.7% by weight of the sintering aid is used, produced the most preferred results. It has been found that addition of a sintering aid in the polymerization Step (A') by obtaining insoluble and unmeltable polycarbosilane (Examples 7–11 and 13), even if a sintering temperature is reduced by about 100° C, can provide an efficient sintered body which is not inferior to the results obtained when addition of the aid takes place in Step (B') (Examples 2 through 6 and 12). On the other hand, the sintered bodies in Examples 4, 5, 9 and Contrast Examples 1, and 2 are excellent in density but those in Examples 1 and 2 contain a large quantity of free Si that reduced high temperature strength.

What we claim is:

1. A method of producing a dense sintered silicon carbide body from polycarbosilane comprising the steps of:
   (A) Polymerizing an organosilicon compound to yield polycarbosilane, said polycarbosilane being insoluble and unmeltable;
   (B) Pulverizing said polycarbosilane so as to form a powder; and
   (C) Hot pressing said powder so as to produce said dense sintered silicon carbide body by charging said powder into a hot press mold, heating said powder in a nonoxidizing atmosphere to thereby decompose said powder thus producing silicon carbide, and sintering said silicon carbide under pressure.

2. A method according to claim 1, wherein said thermal decomposition in the Step (C) is carried out in a temperature range of 600° to 1000° C.

3. A method according to claim 1, wherein said sintering in the Step (C) is carried out in a temperature range of 1900° to 2200° C under a pressure of up to 250 kg/cm².

4. A method according to claim 1, wherein the hot pressing Step (C) further includes exhausting from said mold the gas produced as a by-product by said thermal decomposition.

5. A method of producing a dense sintered silicon carbide body from polycarbosilane comprising the steps of:
   (A) polymerizing organosilicon compounds so as to form an insoluble, unmeltable polycarbosilane,
   (B) pulverizing said polycarbosilane to provide a powder and mixing said powder with a sintering aid to provide a mixture, and
   (C) hot pressing said mixture in a hot press mold so as to produce said dense sintered silicon carbide body by heating said mixture in a nonoxidizing atmosphere to thereby decompose said polycarbosilane so as to form silicon carbide, and sintering said silicon carbide under pressure.

6. A method according to claim 5, wherein said sintering aid is selected from the group consisting of the elements of B, C, Al, Fe, Ga, Ti, W, Mg, Ca, Ni, Cr, Mn, Zn, In, Sc, and Be, and compounds of said elements.

7. A method according to claim 5, wherein said sintering aid is selected from a group consisting of $B_4C$, Fe, Al, $ZrB_2$, W and MgO.

8. A method according to claim 5, wherein the amount of said sintering aid is in the range of 0.3 to 1.0% by weight based on said polycarbosilane powder.

9. A method according to claim 5, wherein said thermal decomposition in the Step (C) is carried out in a temperature range of 600° to 1000° C.

10. A method according to claim 5, wherein said sintering in the Step (C) is carried out in a temperature range of 1900° to 2200° C under a pressure of up to 250 kg/cm².

11. A method according to claim 5, wherein the hot pressing step (C) further includes exhausting from said mold the gas produced as a by-product by said thermal decomposition.

12. A method of producing a dense sintered silicon carbide body from polycarbosilane comprising the steps of:
(A) polymerizing an organosilican compound with addition of a sintering aid so as to form an insoluble and unmeltable polycarbosilane containing said sintering aid,
(B) pulverizing said polycarbosilane to provide a powder,
(C) hot pressing said powder so as to produce said dense sintered silicon carbide body by charging said powder into a hot press mold, heating the powder in a nonoxidizing atmosphere to thereby decompose said powder so as to produce silicon carbide, and sintering said silicon carbide under pressure.

13. A method according to claim 12, wherein said sintering aid is selected from a group consisting of the elements of B, C, Al, Fe, Ga, Ti, W, Mg, Ca, Ni, Cr, Mn, Zr, In, Sc and Be, and compounds of said elements.

14. A method according to claim 12, wherein said sintering aid is from a group consisting of the elements of B, Al, Fe and Ti, halides and organic compounds of said elements.

15. A method according to claim 12, wherein said sintering aid is added so as to yield said polycarbosilane containing therein 0.1 to 3.0% by weight of the element of B, Al, Fe and Ti.

16. A method according to claim 12, wherein said thermal decomposition in the Step (C) is carried out in a temperature range of 600° to 1000° C.

17. A method according to claim 12, wherein said sintering in the Step (C) is carried out in a temperature range of 1830 to 2100° C under a pressure of up to 250 kg/cm$^2$.

18. A method according to claim 12, wherein the hot pressing Step (C) further includes exhausintg from said mold the gas produced as a by-product of said thermal decomposition.

19. A method according to claim 1 wherein said powder produced in step (B) has a size of less than about 100 mesh.

20. A method according to claim 5 wherein said powder produced in step (B) has a size of less than about 100 mesh.

21. A method according to claim 12 wherein said powder produced in step (B) has a size of less than about 100 mesh.

* * * * *